United States Patent [19]
Hurst

[11] 3,839,164
[45] Oct. 1, 1974

[54] METHOD OF MANUFACTURING CAPACITORS IN AN ELECTRONIC MICROSTRUCTURE

[76] Inventor: Gilbert Hurst, 20 Rue Charles Peguy, Caen, France

[22] Filed: May 22, 1972

[21] Appl. No.: 255,799

[30] Foreign Application Priority Data
May 24, 1971  France .............................. 71.18642

[52] U.S. Cl. ............ 204/38 S, 204/248, 204/DIG. 3
[51] Int. Cl. ......................... C23f 17/00, B01k 3/00
[58] Field of Search ........... 204/DIG. 3, 129.4, 248, 204/249, 38 A, 38 S, 15

[56] References Cited
UNITED STATES PATENTS
2,640,806   6/1953   Hesch ............................ 204/129.4
2,853,445   9/1958   Catott et al. ..................... 204/129.4
3,389,060   6/1968   Greene ............................ 204/248
3,699,011   10/1972  Nishimura ......................... 204/15

Primary Examiner—T. M. Tufariello
Attorney, Agent, or Firm—Frank R. Trifari

[57] ABSTRACT

Method of manufacturing capacitors at the level of the interconnections of an electronic microstructure.

The dielectric of the capacitors is obtained by oxidation of a first electrode layer in an oxidizing bath in the presence of an electrode producing a battery effect and in the absence of an external voltage source.

8 Claims, 8 Drawing Figures

METHOD OF MANUFACTURING CAPACITORS IN AN ELECTRONIC MICROSTRUCTURE

The present invention relates to a method of manufacturing capacitors in a planar electronic microstructure which comprises active and/or passive semiconductor elements, according to which method a first metal layer is locally deposited on a substrate, after which a dielectric layer is formed on the first metal layer and a second metal layer is deposited on the dielectric layer, The present invention also relates to the electronic microstructures comprising a capacitor manufactured according to this method.

For manufacturing capacitors in an electronic microstructure, the thin-layer technology is preferably used in which the capacitors manufactured according to this technology have a greater capacity per surface unit and much smaller stray resistances than usual diffused junctions.

The capacity of the thin-layer capacitors does not depend upon the applied voltage as that of the semiconductor junctions.

The semiconductor material used as a dielectric in the capacitors is usually silicon dioxide because this oxide is usually formed during preparation steps in which the starting material is a silicon substrate. However, this oxide has a low dielectric constant. Because it is difficult to realize very small thicknesses starting from this oxide, due to the danger of the occurrence of insulation defects, it has been endeavoured to replace said dielectric by other oxides having higher dielectric constants, for example, aluminum oxide or tantalum oxide. The known methods of obtaining thin homogeneous and dense layers of said dielectric oxides require extra complicated processes and require a considerable and expensive equipment. The aluminum oxide is preferably obtained by thermal decomposition of an organo-metallic compound. Such a method also necessitates a comparatively high substrate temperature due to the decomposition of said organo-metallic compound, at which temperature the semiconductor elements of the device may be damaged.

The oxide can also be obtained by anodic oxidation in which with an external voltage source a voltage is applied between the metal surface to be oxidized and an electrode dipped in the electrolyte. The multiple contact points necessitated by said method present great difficulties due to their very large number and the small available surface area.

The quality of the dielectric obtained by most of the known methods moreover necessitates to protect said layer from a possible diffusion of the metal of the capacitor plates. The aluminium which preferably forms the mutual conductors of the electronic microstructures diffuses in the aluminium oxide obtained by the known methods, as a result of which a protective layer is to be provided of a metal which prevents said diffusion; for example, nickel is deposited on either side of the aluminium oxide layer.

It is the object of the invention to avoid the drawback of the known method and to manufacture capacitors which can be integrated in a planar electronic microstructure by reproducible simple processes which can be combined with the manufacture of the other elements of the microstructure and in particular with the manufacture of the connections between the elements of the microstructure.

Another object of the invention is the manufacture of capacitors the dielectric of which is a metal oxide having a high dielectric constant and the metal of which is otherwise suitable for the manufacture of connections at the surface of a semiconductor microstructure plate.

Another object of the invention is the manufacture of capacitors by a method which enables in an efficacious manner to check the formation of the dielectric and to obtain a regular and homogeneous dielectric layer having previously determined characteristics.

In the method according to the invention a dielectric is formed by oxidation of a metal having a good electric conductivity under controllable and reproducible conditions without supplying current from without.

According to the invention, the method of manufacturing capacitors in a planar electronic microstructure which comprises active and/or passive semiconductor elements, according to which method a first metal layer is locally deposited on a substrate after which a dielectric layer is formed on the first metal layer and a second metal layer is deposited on the dielectric layer, is characterized in that after depositing the said first layer the said substrate is dipped in an oxidation bath together with an electrode with which the said substrate is in electric contact, while avoiding an external voltage source, the electrode is made of a metal which cannot be attacked by the said bath, and that the said oxidation bath shows the equilibrium potential which is at least 2 volts higher than that of the said first metal layer.

The oxidation of the surface of the first metal layer which is caused by an oxidizing solution forms an insulating oxide skin which rapidly restricts the action of the solution. An electrochemical equilibrium could rapidly be achieved without the presence in the solution of a metal the equilibrium potential of which in the solution is higher than that of the metal of the said layer. The reaction which is caused by the battery effect which is produced by the unattackable electrode enables the manufacture of a homogeneous and denser metal layer of the desirable thickness which is suitable to serve as a dielectric in a capacitor integrated in a microstructure.

Such a method is simple and economical and does not necessitate a voltage source, does not require a complicated device and does not require high temperatures which are detrimental to the semiconductor elements. The resulting capacitors show all the advantages of the capacitors having an oxide dielectric layer. The resulting capacitors are not polarized and in the case in which the first metal layer is manufactured from aluminium, the resulting capacitors show all the advantages of the dielectric properties of aluminium oxide and in particular the high dielectric constant thereof.

The resulting oxide thicknesses may be very small and enable the realization of high capacities per surface unit. On the one hand these thicknesses depend upon the concentration of oxidizing ions of the treatment bath and on the nature of the metal which forms the second electrode, on the other hand on the temperature and the duration of the treatment. The conditions for forming oxides are thus easily controllable and the method is reproducible.

The contact between the plate in which the planar microstructure is realized and the electrode must be very good. A favourable method of manufacturing said electrode with an excellent contact consists in depositing a layer of the chosen metal as an electrode on the face of the plate which is present opposite to the face on which a capacitor is deposited. With this method, the electric resistance presented by the plate itself between the electrode and the metal of the first layer is minimized and the electric field is regularly distributed when the faces are parallel, as will substantially always be the case. The breakdown voltages of the resulting dielectric layers are high and show no dispersion.

In the case in which the first layer of aluminium is made on a plate of silicon, thicknesses in the order of a few tens of Angstroms of the oxide are obtained by dipping the plate, for example, in a bath containing fuming nitric acid, in which the plate is in contact with an electrode of a noble metal which is not attacked by the solution, preferably gold, the equilibrium potential of which in nitric acid is more than 2 volts higher than that of aluminium. A similar result is obtained by using a bath containing potassium bichromate at a temperature between 70° and 85°C and a gold electrode. Platinum or a metal of the group of platinum may be used instead of gold.

The planar electronic microstructures comprise elements which are to be connected together and to other elements. The necessary connections are usually realized by means of deposited metal conductors. The capacitors manufactured according to the invention are preferably obtained simultaneously with the interconnections. In this manner no extra operation is required for said capacitors. The two metal layers may form two connection levels.

It is obvious that during the dipping of the plate in the oxidation bath, the surface on which the oxide is undesirable and the surfaces beyond the first metal layer can be protected by a suitable protective coating. It has been found that a silicon oxide layer, such as the layer at the surface of a silicon plate after the various operations preceding the metal deposition for the interconnections, is sufficient for such a protection.

If no direct contact is to be made on the metal layer, it is favourable that the oxidation bath in which the plate is dipped on which an aluminium layer is locally deposited by means of a photoetching treatment, also serves to remove the undesirable left photo-etching lacquer.

In manufacturing silicon plates having a semiconductor device with rapid response characteristic it is known to perform a gold diffusion so as to reduce the life of the charge carriers in the semiconductor material. A gold deposit which is carried out on the surface of the said plate which is provided opposite to the surface on which the metal layer is deposited, is preferably used as a gold diffusion source and as an electrode which is in contact with the plate during the dipping in the oxidation bath. Such an electrode shows a good contact, a large exchange surface area, and does not necessitate extra operations nor extra consumption of material.

Various oxidation baths may be used, for example, fuming nitric acid, potassium bichromate with an addition of a fluoride to dissolve the chromium oxides and a carbonate to increase the pH of the bath. Ammonium salts may be used instead of potassium salts or sodium salts.

A stabilization treatment to minimize any porosity of the formed dielectric layer is preferably carried out after the oxidation. This treatment may be carried out by using the known method of "sealing" which is usually used to improve porous oxide layers, for example, dipping in very pure boiling water.

The present invention is used for manufacturing capacitors in electronic microstructures and in particular in integrated circuits on a silicon substrate.

The invention will be described in greater detail with reference to the accompanying drawings, in which FIGS. 1a to 1f show the manufacturing stages of a plate according to the invention.

Figure 1A:
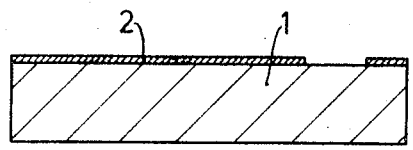
Figure 1B:
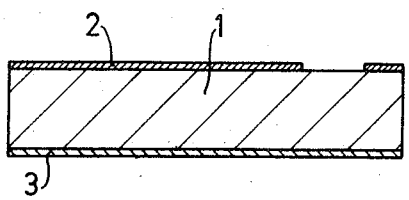
Figure 1C:
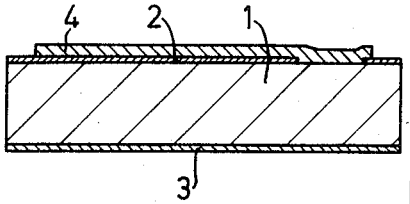
Figure 1D:
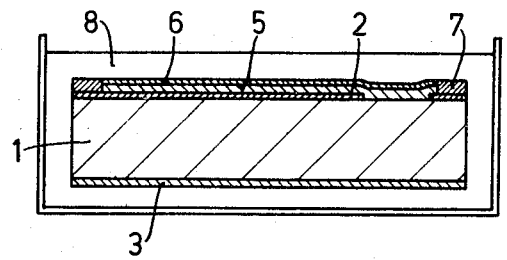

In the example shown in FIGS. 1a to 1f the starting material is a semiconductor plate 1 which is locally covered with an insulating layer 2 which usually consists of silicon oxide $SiO_2$ (FIG. 1a). One side of said plate is covered with a gold layer 3 which is destined to improve certain characteristic features of the device manufactured in the plate 1 (FIG. 1b). On the surface of this plate which is partially covered with silicon oxide and opposite to the gold-coated surface, a first aluminium layer 4 is locally deposited according to a surface the shape of which corresponds to a first plate of the capacitor to be manufactured and which must be in direct electric contact with the plate itself (FIG. 1c).

The plate is then dipped in an oxidation bath 8 (FIG. 1d) in which a protecting layer 7 is provided throughout the surface of the plate with the exception of the surface which corresponds to the dielectric of the capacitor to be manufactured. The aluminium layer which is thus exposed to the action of an oxidation bath is partially converted into an aluminium oxide layer 6; below the aluminium oxide layer an aluminium layer 5 remains which is not attacked.

Figure 1E:
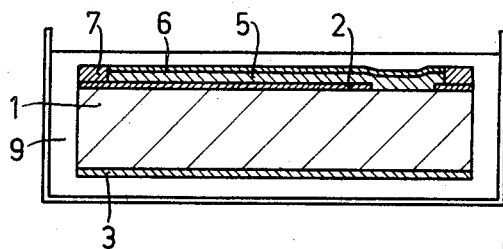

The plate is then treated by dipping in very pure boiling water 9 so that the porous aluminium oxide layer 6 is converted into non-porous aluminium oxide (FIG. 1e).

Figure 1F:
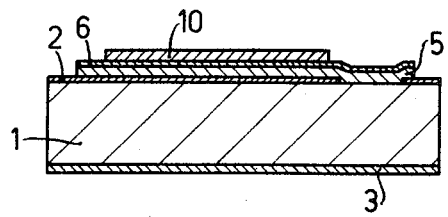

The second layer 10 is then deposited, for example, by vapour deposition in a vacuum succeeded by photoetching (FIG. 1f).

In accordance with the duration of the oxidation treatment, capacitors are obtained the breakdown voltages of which may be between 5 and 200 volts and the capacity of which per surface unit can exceed 200 pf per sq.mm.

Figure 2:
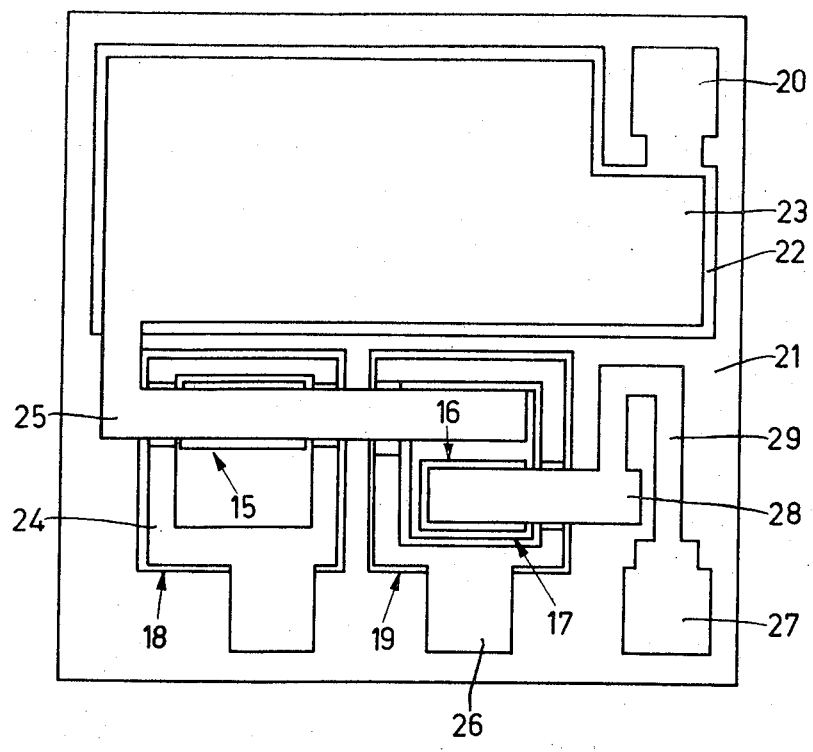
FIG. 2 is a plan view of a fragment of a semiconductor plate with integrated circuit having a capacitor manufactured according to the invention.

The partial plan view of FIG. 2 shows an example of an integrated circuit having a capacitor manufactured according to the invention. The part shown comprises a capacitor of which an upper plate 23 and a lower plate 22 are visible. This latter plate 22 is connected to a contact face 20 and the other plate 23 is connected, by a deposited conductor 25, to a diode of which a region 15 and a second region 18 are visible, the latter showing a contact face 24. The connection conductor 25 is also connected to the base 17 of a transistor the emitter of which is denoted by 16 and the collector by 19. The circuit also comprises a resistor 29 obtained by eposition. The plate 22 is partially deposition. and treated to form the dielectric of the capacitor. The second plate 23 is deposited simultaneously with the conductors 25, 28 and 27.

Figure 3:
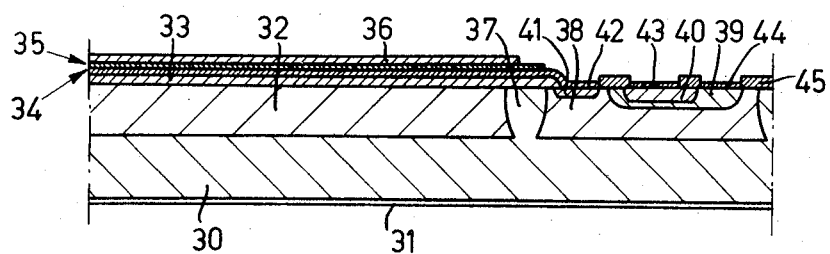
FIG. 3 is a diagrammatic cross-sectional view of a part of a semiconductor plate with integrated circuit having a capacitor manufactured according to the invention.

The cross-section shown in FIG. 3 shows another example of an integrated circuit having a capacitor according to the invention. The part of the circuit shown in the drawing and manufactured in a silicon plate 30 comprises a transistor the emitter 40 of which is diffused in the base 39 which itself is diffused in an epitaxial collector 38. The collector, as well as the other islands, is bounded by diffused insulation zones 37. After the diffusion treatments, the plate is partially covered with an insulating layer of $SiO_2$ 33 – 45. A first capacitor plate 34 is simultaneously deposited with the base, emitter and collector contacts 44, 43 and 42, respectively, the latter of which is present on a collector contact region 41. The dielectric of the capacitor is the oxide 35 which is formed by superficial oxidation of the greater part of the metal layer 34. The second plate consists of the deposited metal layer 36.

What is claimed is:

1. A method of manufacturing a capacitor in a planar electronic microstructure having a semiconductor substrate with two major surfaces, comprising the steps of:

selecting a first conductive metal;
   forming an oxidation bath which has an equilibrium potential at least two volts higher than said first metal;
   selecting a second conductive metal which does not react with said oxidation bath;
   depositing a first layer of said first metal on at least a portion of one major surface of said substrate;
   depositing an opposing layer of said second metal on at least a portion of the other major surface of said substrate;
   dipping said substrate and deposited layers into said formed bath, thereby oxidizing the surface of said first layer;
   depositing a second layer of said first metal on at least a portion of said oxidized surface of said first layer thereby forming a capacitor between said first and second layers.

2. The method defined in claim 1 wherein said substrate is silicon, said first metal is selected of aluminum and said second metal is selected of gold.

3. The method defined in claim 2 wherein said bath is formed of fuming nitric acid.

4. The method defined in claim 2 wherein said bath is formed of a bichromate of an alkaline element at a temperature exceeding 70°C.

5. The method defined in claim 4 wherein said formed bath also contains a fluoride to dissolve oxides of the alkaline element and a carbonate to increase the PH of the bath.

6. The method defined in claim 2 wherein said bath is formed of amonium or sodium salts.

7. The method defined in claim 2 wherein said dipping step is followed by the additional step of dipping said oxidized surface of said first layer into pure boiling water in order to assure that said oxidized surface is not porous.

8. The method defined in claim 1 wherein said substrate is silicon, said first metal is selected of aluminum and said second metal is selected from the group consisting of platinum, iridium, palladium and rhodium.

* * * * *

UNITED STATES PATENT AND TRADEMARK OFFICE
CERTIFICATE OF CORRECTION

PATENT NO. : 3,839,164
DATED : October 1, 1974
INVENTOR(S) : GILBURT HURST

It is certified that error appears in the above-identified patent and that said Letters Patent are hereby corrected as shown below:

Col. 5, line 1, "eposition" change to --deposition--, change "deposition" to --oxidized--, and delete ".".

Signed and Sealed this

First Day of February 1977

[SEAL]

Attest:

RUTH C. MASON
Attesting Officer

C. MARSHALL DANN
Commissioner of Patents and Trademarks